July 13, 1926.  1,592,737
M. A. KUEBBELER
COVER FOR FRUIT JARS AND LOCKING MEANS THEREFOR
Filed Sept. 18, 1924
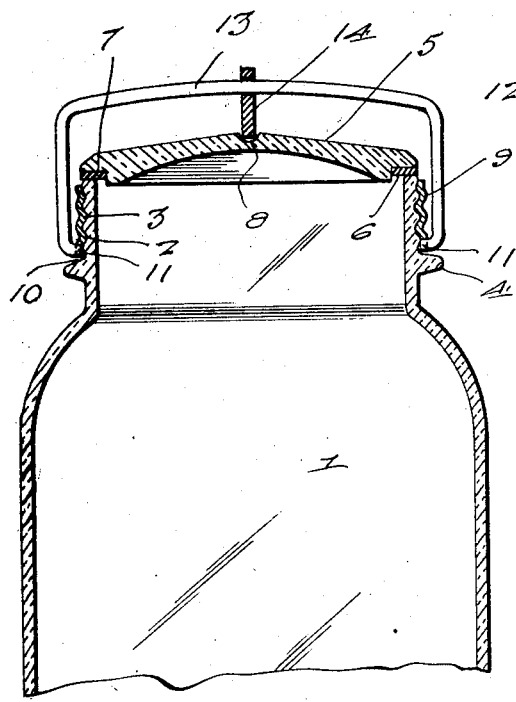
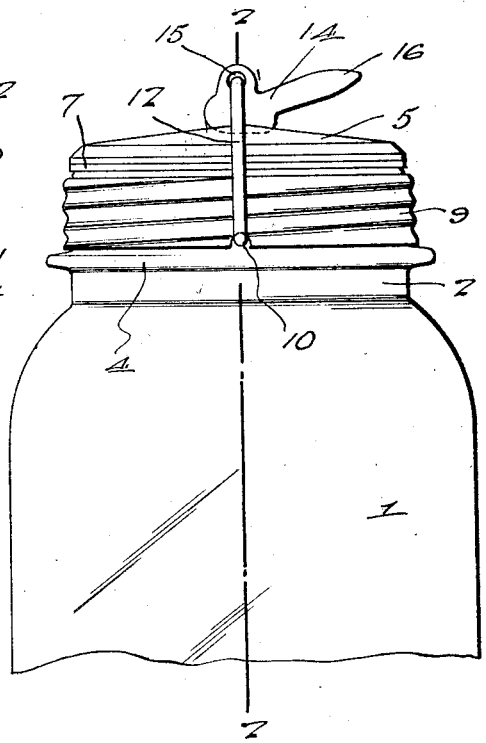
Inventor
M. A. Kuebbeler
Clarence A. O'Brien
Attorney Patented July 13, 1926.

1,592,737

UNITED STATES PATENT OFFICE.

MATTHEW A. KUEBBELER, OF TOLEDO, OHIO.

COVER FOR FRUIT JARS AND LOCKING MEANS THEREFOR.

Application filed September 18, 1924. Serial No. 738,410.

This invention relates to improvements in receptacles having removable closures and is more particularly adapted to a fruit jar wherein the cover therefor may be secured in position on the fruit jar in such a manner as to prevent the liquid contents of the fruit jar from leaking.

One of the important objects of the present invention is to provide a device of the above mentioned character, wherein the cover for the fruit jar may be readily and easily secured in a locked position on the fruit jar as well as released from engagement therewith as may be desired.

A still further object of the invention is to provide a cover securing means of the above mentioned character, which may be readily and easily attached in position on the threaded neck of a fruit jar of the usual construction.

A still further object of the invention is to provide a cover securing means of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:—

Figure 1 is a side elevation of the cover securing means embodying my invention, and Figure 2 is a vertical section taken approximately on line 2—2 of Figure 1.

In the drawing wherein for the purpose of illustration is shown the preferred embodiment of my invention, the numeral 1 designates a fruit jar preferably of the Mason type, the neck thereof being indicated at 2 and being further provided with the usual external threads 3. The annular flange which extends around the neck 2 of the fruit jar is shown at 4.

The cover for the open top of the fruit jar 1 is illustrated at 5 and the bottom thereof is cut away as illustrated at 6 to receive the rubber gasket or washer 7 which rests on the upper edge of the neck of the fruit jar. The top of the cover 5 is provided with a groove or channel 8 in the central portion thereof for the purposes hereinafter to be more fully described.

The cover securing means comprises an internally threaded ring or band 9 which is adapted to be threaded on the neck 2 and the lower edge of the band is adapted to engage the upper surface of the annular flange 4. Arranged at diametrically opposite points in the lower edge of the band 9 are the notches 10 and the purpose thereof is to provide a means for receiving the free ends 11 of the wire bail 12 which is adapted for swinging movement over the top of the cover 5. The provision of the notches 10 enables the free ends 11 of the wire bail 12 to be supported between the flange 4 and the lower edge of the band 9 against accidental disengagement from the band and permit the free swinging movement of the bail with respect to the band. By loosening the band 9 from engagement with the threaded portion 3 of the neck 2 so that the lower edge thereof moves upwardly from the annular flange 4, the free ends of the bail may be readily disengaged from the notches 10 in order to permit the removal of the wire bail from the band.

The intermediate portions 13 of the bail 12 is spaced from the top of the cover 5 and supports thereon the locking cam 14, the latter being provided with an opening 15 to permit the free sliding movement and swinging movement of the cam on the intermediate portion 13 of the wire bail 12. The locking cam 14 is further provided with an extension 16 which forms an actuating lever.

When the cam 14 has its lower end disposed within the groove or channel 8 provided in the central portion of the top of the cover 5, the cover will be sealed on the neck of the fruit jar and prevent the liquid contents from leaking out from the fruit jar. When it is desired to remove the cover from the fruit jar, it is only necessary to raise upwardly on the lever 16 on the cam 14 disengaging the same from the groove or channel 8 in the cover 5 and swing the bail 12 in either direction over the side of the neck of the fruit jar and thereby enable the cover to be readily disengaged from the upper edge of the neck of the fruit jar.

It will thus be seen from the foregoing description that a cover locking means has been provided which may be used in connection with the fruit jars and covers therefor now universally in use and will at all times be positive and efficient in securing the cover in a sealed position on the upper edge of the neck of the fruit jar.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination with a fruit jar, the neck thereof being externally threaded, an annular flange formed on the neck below the threaded portion thereof, a cover supported on the upper edge of the neck, a band threaded on the threaded portion of the neck, the lower edge of said band engaging said flange and being provided with diametrically opposed notches, a wire bail having the free ends thereof disposed in said notches and adapted for pivotal movement on said band, and a locking cam pivotally carried by the intermediate portion of the bail and adapted for engagement with the top of the cover for securing the latter in sealed engagement with the upper edge of the neck of the fruit jar.

In testimony whereof I affix my signature.

MATTHEW A. KUEBBELER.